UNITED STATES PATENT OFFICE.

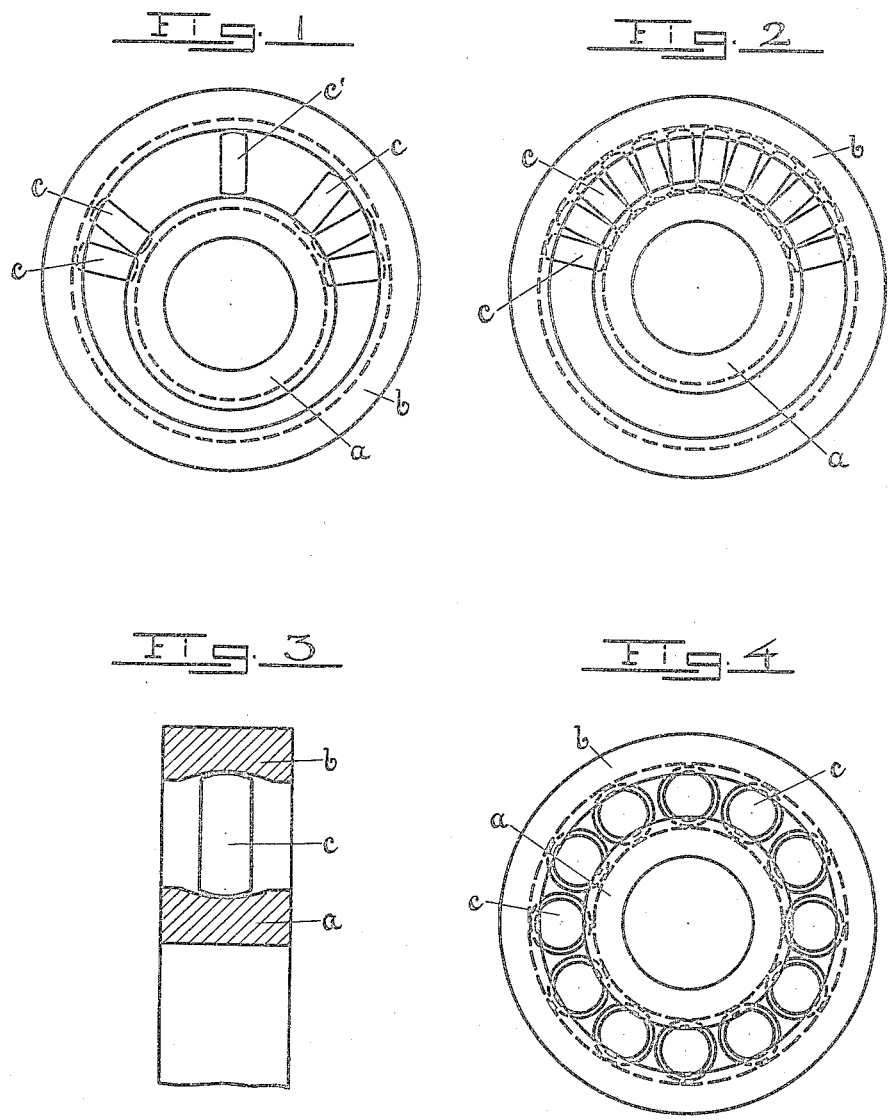

ERNST HJALMAR WALODDI WEIBULL, OF GOTTENBORG, SWEDEN, ASSIGNOR TO NORDISKA KULLAGER AKTIEBOLAGET, OF GOTTENBORG, SWEDEN.

ROLLER-BEARING.

1,375,877. Specification of Letters Patent. Patented Apr. 26, 1921.

Application filed April 26, 1919. Serial No. 292,927.

*To all whom it may concern:*

Be it known that I, ERNST HJALMAR WALODDI WEIBULL, a subject of the King of Sweden, residing at Gottenborg, in the county of Gottenborg and Bohus and Kingdom of Sweden, have invented new and useful Improvements in Roller-Bearings, of which the following is a specification.

This invention relates to antifriction roller-bearings and particularly to such bearings having comparatively short or disk-shaped rollers operating in grooves in both the race-rings.

The invention has for its object to provide an improved method for insertion of rollers of the kind mentioned between the grooves of the race-rings in their proper operating position.

For insertion of rollers in roller-bearings many different methods are used. Thus it is known to employ special filling-openings in the same manner as customary in antifriction ball-bearings. This proceeding, however, injures the continuity of the race-grooves. It is also known, as shown by the British Patent No. 29925 of 1897, to place the race-rings eccentrically in relation to each other and to insert such a plurality of rollers as the eccentric position of the race-rings allows. Through this method, however, only a limited number of rollers can be inserted. Further it has been proposed concerning comparatively short or disk-shaped rollers to insert the rollers in upset position, so that the normal axis of rotation of respective roller is kept somewhat parallel to a radius of the bearing proper after which operation the roller is turned into its operative position. When utilizing the method last mentioned the material of the rollers as well as of the race-rings is subjected to rather heavy strains, and in order to avoid that the rollers and race-rings will suffer a permanent deformation thereby, the length or breadth of the rollers must not exceed a certain value in consideration of the diameter of the same.

By means of the present invention all the disadvantages above mentioned are overcome besides, which the full number of rollers under certain circumstances can be inserted into the bearing without exposing the material to any additional strain.

In the accompanying drawing the procedure of inserting the rollers in a single-row grooved roller-bearing is illustrated diagrammatically with the rollers designed according to this invention.

Figure 1 illustrates a side view of the bearing, as it appears when commencing the assembling.

Fig. 2 shows all the rollers inserted, but not yet turned around into their operative position.

Fig. 3 illustrates a cross-section of a portion of the bearing.

Fig. 4 is a side view of the bearing with its rollers moved or arranged into their normally operative position.

In the drawing, the inner race ring is denoted by $a$, the outer race ring by $b$ and the disk-shaped rollers by $c$. Fig. 1 shows how the inner race ring $a$ is held in an eccentric position with reference to the outer race ring $b$, while a roller $c'$ is inserted into the groove by being pushed in between the edges of the two race rings.

Fig. 2 illustrates how all the rollers $c$ are turned or arranged at right angles to their normal operative position and brought close together in the upper semicircular part of the interspace between the two bearing-rings with the plain side surfaces facing each other. The inner race ring $a$ is shown in the concentric operative position with respect to the outer race ring $b$, which is possible, inasmuch as the rollers are disposed in the race grooves.

Fig. 4 illustrates how the rollers are distributed equidistantly all around the annular interspace between the race rings and arranged in their proper operative positions. How this is to be effected may easily be understood and does not need to be particularly described.

In order to make it possible to insert the full number of rollers, which the bearing on the whole can accommodate the breadth or length of the rollers, as shown by Fig. 2, must not be larger than that when all the rollers, turned at right angles to their normal operative position are pushed close together they do not occupy more space than half the circumference of the inner race-ring.

Having now particularly described and ascertained the nature of my said invention and in what manner the same is to be performed, I declare that what I claim is:

A method for inserting disk-shaped rollers in an anti-friction roller bearing having two race-rings and grooves in both the race-rings consisting in inserting the rollers between the race-rings when turned at right angles to their normal operative position with the middle plane of each roller perpendicular to the axis of rotation of said roller in a plane through the axis of the bearing while the two race-rings are held eccentrically in relation to each other, then pushing the rollers close together, then bringing the race-rings into concentric relation and distributing the rollers along the whole circumference of the race-ring and finally 90 degrees into their normal operative position.

In testimony whereof I have affixed my signature in presence of two witnesses.

ERNST HJALMAR WALODDI WEIBULL.

Witnesses:
BIRGER NAAC,
ALLAN ODHQUIST.